Figure 1:
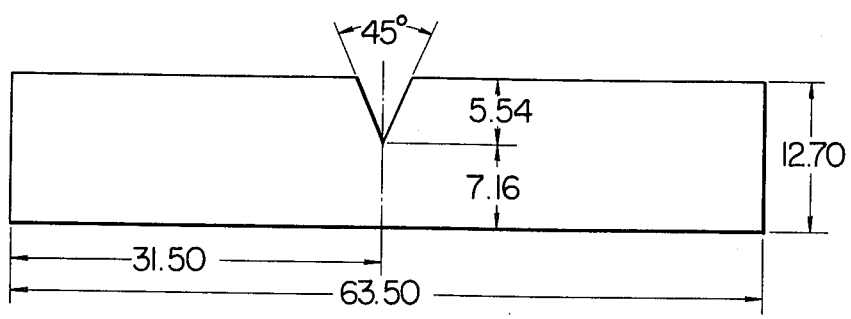

United States Patent [19]

Nakajima et al.

[11] Patent Number: 4,487,875

[45] Date of Patent: Dec. 11, 1984

[54] ULTRA-HIGH MOLECULAR WEIGHT POLYETHYLENE COMPOSITION

[75] Inventors: Nobuhiro Nakajima, Tokyo; Jyoji Ibata, Mishima, both of Japan

[73] Assignee: Asahi Kasei Kogyo Kabushiki Kaisha, Osaka, Japan

[21] Appl. No.: 581,441

[22] Filed: Feb. 17, 1984

Related U.S. Application Data

[63] Continuation of Ser. No. 368,051, Apr. 13, 1982.

[30] Foreign Application Priority Data

| Apr. 18, 1981 | [JP] | Japan | 56-58722 |
| Apr. 24, 1981 | [JP] | Japan | 56-61442 |
| Apr. 24, 1981 | [JP] | Japan | 56-61440 |
| Oct. 2, 1981 | [JP] | Japan | 56-157336 |

[51] Int. Cl.³ ............................................. C08K 5/05
[52] U.S. Cl. ................................... 524/385; 528/495; 264/211
[58] Field of Search ............ 264/211; 524/385; 528/495

[56] References Cited

U.S. PATENT DOCUMENTS

| 2,933,484 | 4/1960 | Klumb et al. | 528/495 |
| 3,076,776 | 2/1963 | Findlay | 524/385 |
| 3,219,728 | 11/1965 | Joris et al. | 524/481 |
| 3,803,065 | 4/1974 | Arai et al. | 524/385 |
| 3,976,612 | 8/1976 | Kaji et al. | 524/385 |
| 4,239,862 | 12/1980 | Matthews et al. | 524/385 |

FOREIGN PATENT DOCUMENTS 685971   5/1964   Canada ............................ 524/385

Primary Examiner—Joseph L. Schofer
Assistant Examiner—N. Sarofim
Attorney, Agent, or Firm—Sprung, Horn, Kramer & Woods

[57] ABSTRACT

A composition improved in extrudability which comprises 100 parts by weight of an ultra-high molecular weight polyethylene having a viscometrically determined molecular weight of 1,000,000–6,000,000 and 10–50 parts by weight of modifier, said modifier comprising at least one member selected from the group consisting of (A) saturated aliphatic alcohols having 15–30 carbon atoms and (B) petroleum hydrocarbon cyclopentadiene type resins having a molecular weight of 500–2,000 and a softening point of 70°–130° C. and, as an optional component, (C) a low molecular weight polyethylene having a molecular weight of 1,000–20,000.

15 Claims, 2 Drawing Figures

ULTRA-HIGH MOLECULAR WEIGHT POLYETHYLENE COMPOSITION

This is a continuation of application Ser. No. 368,051, filed Apr. 13, 1982.

This invention relates to novel ultra-high molecular weight polyethylene compositions. The object of this invention consists in providing ultra-high molecular weight polyethylene compositions greatly improved in extrudability without deteriorating the excellent physical properties which are originally possessed by the ultra-high molecular weight polyethylene and unseen in other resins.

Ultra-high molecular weight polyethylene (hereinafter referred to as UHMWPE) has a viscometrically determined average molecular weight of about one million or more and its excellencies in impact strength and wear resistance are well-known in the industry. However, because of its high melt elasticity and high melt viscosity, it cannot be extrusion-molded economically. Accordingly, it is usually molded by the compression-sintering process necessitating a high consumption of energy.

It has hitherto been attempted to improve the extrudability of UHMWPE by adding a certain kind of lubricant to it. However, in order not to injure its mechanical properties, the amount of said lubricant has been limited to at most about 5 phr (5 parts by weight per 100 parts by weight of UHMWPE), with which it has been impossible to improve the extrudability sufficiently.

As a technique for greatly improving extrudability by increasing the amount of lubricant, U.S. Pat. No. 3,219,728 can be referred to. According to this technique, a composition improved in extrudability was prepared by intimately mixing 100 parts by weight of high-molecular weight polyethylene (including UHMWPE; in this section, it is referred to as HMWPE) having a molecular weight of 500,000 or more with 10-50 parts by weight of alkane hydrocarbon (concretely, it was a low molecular weight polyethylene having a molecular weight of 1,500-3,000; throughout this section, it is referred to as LMWPE) by the following complicated procedure. Thus, in mixing them, a fused LMWPE and a powdery HMWPE were mixed together with thorough stirring at a temperature at which only the LMWPE could fuse and the HMWPE could not fuse. The stirring was continued until the HMWPE powder was intimately mixed with the fused LMWPE and had taken up substantially all of the fused LMWPE between and upon the HMWPE particles. The resulting composition remained powdery or readily friable to a powder when a allowed to cool.

When a composition was prepared according to one example of the above-mentioned patent by mixing 100 parts by weight of an UHMWPE having a molecular weight of 2,200,000 with 25 parts by weight of a LMWPE having a molecular weight of 2,000 and a molded article prepared from the composition was examined for physical properties by a method devised by us as mentioned later, the molded article was markedly inferior to UHMWPE itself in wear resistance and impact strength.

As above, the above-mentioned patent has a fault that the procedure of mixing is complicated and the product is inferior in important physical properties, even though the product is improved in extrudability.

In the extrusion molding of UHMWPE, the important factors are (1) good fluxing in the screw, (2) good transportation in the screw, (3) proper generation of pressure, (4) good transmission of pressure in the die, (5) good flowing into shape in the die, and (6) smooth extrusion not to form cracks at the die exit. Any satisfactory molding is impossible without solving these problems.

The present inventors have attempted to solve these problems by preparing a composition into which specified chemicals have been compounded (hereinafter, said specified chemicals are referred to as "modifiers"). As compared with other resins, the greatest characteristic feature of UHMWPE consists in its excellency in wear resistance and impact strength. Accordingly, the composition herein aimed must be excellent in extrudability and, at the same time, must be able to give molded articles excellent in wear resistance and impact strength.

As the result of elaborated studies, the inventors have succeeded in inventing a composition greatly improved in extrudability and capable of giving molded articles having not greatly lowered wear resistance and impact resistance, by compounding 100 parts by weight of UHMWPE with 10-50 parts by weight of modifiers.

Thus, this invention relates to a composition improved in extrudability which comprises 100 parts by weight of UHMWPE and 10-50 parts by weight of any one member selected from the group consisting of (A) only, (B) only, combination (A)+(B), combination (A)+(C), combination (B)+(C) and combination (A)+(B)+(C), wherein (A) is a saturated aliphatic alcohol having 15-30 carbon atoms, (B) is a petroleum hydrocarbon cyclopentadiene type resin having a molecular weight of 500-2,000 and a softening point of 70°-130° C. and (C) is a low molecular weight polyethylene having a molecular weight of 1,000-20,000.

As referred to in this invention, the term "UHMWPE" means an UHMWPE having a molecular weight of 1,000,000-6,000,000 and preferably 1,500,000-3,000,000 as calculated from the viscosity measured in decalin solution at 135° C. according to the following equation of R. Chiang (J. Polymer Sci. 36, 91 (1959)):

$$[\eta] = 6.20 \times 10^{-4} M^{0.70}$$

wherein $[\eta]$ is intrinsic viscosity and M is molecular weight.

The modifier (A) of this invention is a saturated alcohol having 15-30 carbon atoms and preferably 16-20 carbon atoms. Stearyl alcohol is one of the preferable examples of said modifier (A). Among the coconut alcohol which is the mixture of saturated alcohol of different numbers of carbon atoms, the mixture of those having 16-18 carbon atoms are practically preferable. Lauryl alcohol having 12 carbon atoms is not preferable because it is liquid at ordinary temperature and therefore bleeds out after molding. Saturated alcohols having carbon atoms more than 30 are not available industrially today.

The modifier (B) is a petroleum hydrocarbon cyclopentadiene type resin* having a molecular weight of 500-2,000 and a softening point of 70°-130° C. It is usually produced by the polymerization of dicyclopentadiene rich distillates from cracked petroleum stocks, or further hydrogenating the polymerized product.

[Note]*Because of the petroleum resin, it is impossible to represent them by the molecular formula and accepted to name them as "Petroleum hydrocarbon resin (cyclopentadiene type)" or "Petroleum hydrocarbon resin (cyclopentadiene type), hydrogenated" in F.D.A. regulation in U.S.

The hydrogenated resin is preferable because it has high heat resistance and weatherability. A hydrogenated resin having an average molecular weight of about 1,000 is quite preferable because its melt viscosity is low in proportion to its relatively high softening point (about 90° C.) and a composition prepared by blending its 10–50 parts by weight with 100 parts by weight of UHMWPE gives molded articles improved in impact strength as compared with those prepared from UHMWPE alone.

The third modifier (C) is a low molecular weight polyethylene having a molecular weight of 1,000–20,000. If its molecular weight is less than 1,000, physical properties of molded article become worse. If its molecular weight exceeds 20,000, the compound is not called a low moleculare weight polyethylene and such a compound has no effect of improving extrudability. Therefore, its molecular weight is preferably in the range of 5,000–20,000 from the viewpoint of physical properties and more preferably in the range of 5,000–12,000 from the viewpoint of extrudability.

Modifier (A) and modifier (B) both contribute to the solution of the aforementioned problem of extrudability, even if any one of them is used alone. However, (A) particularly contributes to the solution of problems arising in the die exit side, while (B) particularly contributes to the solution of problems arising in screw and in the die gate side. Accordingly, a greater improving effect can be obtained by using components (A) and (B) in combination. Since component (C) has an effect of enhancing the solubilities between the components and exhibits a particularly high effect on the fluxing in screw, addition of component (C) brings about an additional synergistic improvement in extrudability.

In the composition of this invention, the mode of use of the modifiers may be any of (A) only, (B) only, combination (A)+(B), combination (A)+(C), combination (B)+(C) and combination (A)+(B)+(C), as has been mentioned above. The amount of modifiers used is 10–50 parts by weight and preferably 15–35 parts by weight based on 100 parts by weight of UHMWPE. If it is less than 10 parts by weight, the effect of improving extrudability is insufficient. If it exceeds 50 parts by weight, tensile strength and wear resistance of molded article decrease.

When two or three components of modifiers are added to UHMWPE, the ratio (by weight) of the component used in the smallest amount to the component used in the largest amount is in the range of 1:1 to 1:10. If this range is exceeded, the synergistic effect cannot be expected. More preferably, the range of the ratio is 1:1 to 1:6.

The kind and amount of modifier and the ratio between the amounts of modifiers are arbitrarily selected in the above-mentioned ranges, with consideration of usage, cost and molding process. However, the best balance is obtained when 5–15 parts by weight of component (A), 5–15 parts by weight of component (B) and 5–15 parts by weight of component (C) are used and the sum (A)+(B)+(C) is 15–35 parts by weight per 100 parts by weight of UHMWPE. Particularly, a combination of modifiers in which component (A) is stearyl alcohol, component (B) is a hydrogenated petroleum hydrocarbon cyclopentadiene type resin having an average molecular weight of about 1,000 and a softening point of about 90° C. and component (C) is a low molecular weight polyethylene having an average molecular weight of about 9,000 is preferable.

In this invention, it is allowable to add pigment, inorganic filler, stabilizer, etc., so far as their addition does not injure the characteristic properties of molded article prepared from the composition greatly.

By using the composition of this invention, it has become possible to mold broad sheets without difficulty by means of usual extrusion machine, which has been difficult hitherto.

In spite of the large amount of modifiers added, the molded articles prepared from the composition of this invention are hardly inferior to those prepared from UHMWPE alone in impact strength and wear resistance which are the most important properties. Though its mechanical properties such as tensile strength and flexural modulus are somewhat low, a molded article prepared from the composition of this invention can be used almost without any inferiority to molded articles prepared from UHMWPE alone, from the practical point of view, if it is combined with a support, if necessary. The fact that the most important practical use of molded articles prepared from UHMWPE is liner material to be combined with a support is favorable for the composition of this invention.

The mode of practice of this invention will be explained with reference to the following examples.

Figure 2:
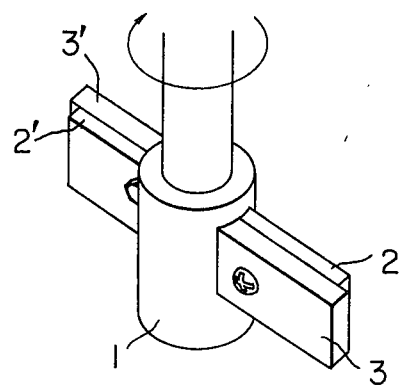

In the drawings attached,

FIG. 1 is a dimensional diagram illustrating that the depth of notch in the test specimen for impact strength measurement, used in the measurements in the examples, is 3 mm deeper than the depth prescribed in ASTM D256; and FIG. 2 is a perspective view of the test specimen attachment part in the apparatus for measuring wear resistance, wherein 1 is rotor, 2 and 2' are one pair of wings and 3 and 3' are test specimens.

EXAMPLES

By means of a single screw extruder, a sheet having a width of 300 mm and a thickness of 3.2 mm was prepared by extrusion molding under the following conditions:

Screw diameter = 50 mm,

Screw L/D = 20,

Temperature profile: Cylinder 160°–180° C., Die 140°–170° C.

In Table 1 are summarized the compounding ratios of the compositions used in the experiments and the results of the experiments, wherein Experiment Nos. 1–29 are examples of this invention and Experiment Nos. 30–35 are comparative examples. The sample of Experiment No. 30 was prepared from UHMWPE alone. Because of impossibility of screw extrusion, it was molded by the compression sintering process. Experiment No. 31 illustrates an example of experiment based on U.S. Pat. No. 3,219,728.

The table illustrates, from the left to the right, the experimental number, the compounding ratio of composition (Note 1), extrudability (Note 2), the impact strength (Note 3), the wear resistance (Note 4), the tensile strength (Note 5) and the elongation (Note 5).

(Note 1) Compounding ratio of composition

In order to simplify the table, the compositions are expressed by abbreviations of which meanings are as follows:

UHPE$_{220}$: UHMWPE having a molecular weight of 2,200,000
UHPE$_{400}$: UHMWPE having a molecular weight of 4,000,000
SA: Stearyl alcohol
CeA: Ceryl alcohol
CoA: Coconut alcohol (carbon number 16-18)
LA: Lauryl alcohol
CR$_9$: Petroleum hydrocarbon cyclopentadiene type resin having a solftening point of 90° C.
CRH$_7$: Hydrogenated petroleum hydrocarbon cyclopentadiene type resin having a softening point of 70° C.
CRH$_9$: Hydrogenated petroleum hydrocarbon cyclopentadiene type resin having a softening point of 90° C.
CRH$_{12}$: Hydrogenated petroleum hydrocarbon cyclopentadiene type resin having a softening point of 120° C.
LPE$_2$: Low molecular weight polyethylene having a molecular weight of 2,000
LPE$_9$: Low molecular weight polyethylene having a molecular weight of 9,000.

In the table, the parenthesized numerical figures express the amounts of modifiers (parts by weight) per 100 parts by weight of UHMWPE.

(Note 2) Extrudability

It is expressed by the maximum extrusion speed with which a sheet having a smooth surface (a surface having no visually detectable wrinkle) can be formed under the conditions of the experiment. Naturally, a sample more easy to extrude can be extruded with a higher speed.

(Note 3) Impact strength—V-notched Izod impact strength

It was measured by a slight modification of ASTM D256 Method A. As the test machine, Cantilever Beam, (Izod type) Impact Machine was employed. In the test specimens, the notch depth was 5.54 mm as shown in FIG. 1 which was 3 mm deeper than the notch depth prescribed in ASTM D256, because at a notch depth of 2.54 mm the test specimens used herein showed no breakdown so that difference could not be detected. Thickness of specimen was 3.2 mm, and temperature of the test was 23° C. The results of the test were expressed by the mean value of lengthwise cut and crosswise cut (J/m).

(Note 4) Wear resistance (Abrasion loss)

Abrasion loss measured in the following manner was employed as an index of wear resistance. A greater value means a lower resistance.

As shown in FIG. 2, test specimens 3 and 3' were attached to wings 2 and 2' of rotor 1 having one pair of wings 2 and 2', and rotor 1 was rotated in a polishing powder to the direction causing a direct collision of the powder against the surface of test specimens in order to wear the test specimens. Abrasion loss was expressed by the proportion (percentage) of the loss in weight due to abrasion to the weight of specimen before abrasion.

Polishing powder: Aluminum oxide powder for polishing having an average diameter of 2 mm
R.P.M.: 500 R.P.M.
Abrasion time: 2 hours
Total revolution: 60,000 revolutions
Temperature: Room temperature (Note 5) Tensile properties—Tensile strength at break and percent elongation at break They were measured by a slight modification of the method prescribed in ASTM D638.

Test machine: Constant-rate-of-crosshead-movement type tensile testing machine
Test specimen:
  Thickness: 3.2 mm
  Width of narrow section: 5 mm
  Length of narrow section: 28 mm
  Gauge length: 20 mm
  Length over-all: 100 mm
Speed of testing: 50 mm/min
Temperature: 23° C.
Test results: Expressed by the mean values (kg/cm$^2$ and %) of lengthwise cut and crosswise cut.

TABLE 1

| Ex. No. | Compounding ratio of composition | Maximum speed (mm/min) | Impact strength (J/m) | Abrasion loss (%) | Tensile strength at break (kg/cm$^2$) | Elongation at break (%) | Note |
|---|---|---|---|---|---|---|---|
| 1 | UHPE$_{220}$ + SA (12) | 80 | 570 | 0.60 | 350 | 450 | |
| 2 | UHPE$_{220}$ + SA (25) | 250 | 590 | 0.72 | 315 | 480 | |
| 3 | UHPE$_{220}$ + SA (40) | 300 | 540 | 0.80 | 300 | 520 | |
| 4 | UHPE$_{220}$ + CRH$_9$ (12) | 80 | 630 | 0.55 | 360 | 450 | |
| 5 | UHPE$_{220}$ + CRH$_9$ (25) | 250 | 645 | 0.65 | 350 | 470 | |
| 6 | UHPE$_{220}$ + CRH$_9$ (40) | 300 | 630 | 0.80 | 350 | 500 | |
| 7 | UHPE$_{220}$ + SA (6) + CRH$_9$ (6) | 100 | 620 | 0.55 | 380 | 480 | |
| 8 | UHPE$_{220}$ + SA (12) + CRH$_9$ (13) | 280 | 640 | 0.70 | 340 | 520 | |
| 9 | UHPE$_{220}$ + SA (20) + CRH$_9$ (20) | 330 | 570 | 0.80 | 300 | 530 | |
| 10 | UHPE$_{220}$ + SA (10) + CRH$_9$ (30) | 300 | 600 | 0.80 | 300 | 530 | |
| 11 | UHPE$_{220}$ + SA (6) + LPE$_9$ (6) | 100 | 600 | 0.72 | 290 | 400 | |
| 12 | UHPE$_{220}$ + SA (13) + LPE$_9$ (12) | 280 | 580 | 0.72 | 250 | 400 | |
| 13 | UHPE$_{220}$ + SA (20) + LPE$_9$ (20) | 330 | 500 | 0.80 | 200 | 410 | |
| 14 | UHPE$_{220}$ + CRH$_9$ (6) + LPE$_1$ (6) | 100 | 640 | 0.55 | 310 | 440 | |
| 15 | UHPE$_{220}$ + CRH$_9$ (15) + LPE$_9$ (10) | 280 | 530 | 0.72 | 260 | 450 | |
| 16 | UHPE$_{220}$ + CRH$_9$ (20) + LPE$_9$ (20) | 330 | 400 | 0.80 | 220 | 450 | |
| 17 | UHPE$_{220}$ + CRH$_9$ (30) + LPE$_9$ (10) | 300 | 450 | 0.80 | 220 | 450 | |
| 18 | UHPE$_{220}$ + SA (4) + CRH$_9$ (4) + LPE$_9$ (4) | 150 | 650 | 0.55 | 310 | 430 | |
| 19 | UHPE$_{220}$ + SA (8) + CRH$_9$ (9) + LPE$_9$ (8) | 300 | 640 | 0.65 | 250 | 430 | |
| 20 | UHPE$_{220}$ + SA (5) + CRH$_9$ (15) + LPE$_9$ (5) | 300 | 640 | 0.65 | 250 | 430 | |
| 21 | UHPE$_{220}$ + SA (13) + CRH$_9$ (14) + LPE$_9$ (13) | 400 | 570 | 0.65 | 230 | 430 | |
| 22 | UHPE$_{220}$ + SA (10) + CRH$_9$ (20) + LPE$_9$ (10) | 400 | 570 | 0.65 | 230 | 430 | |
| 23 | UHPE$_{400}$ + SA (8) + CRH$_9$ (9) + LPE$_9$ (8) | 230 | 640 | 0.53 | 250 | 430 | |
| 24 | UHPE$_{220}$ + CeA (25) | 220 | 590 | 0.72 | 315 | 480 | |
| 25 | UHPE$_{220}$ + CoA (25) | 250 | 590 | 0.80 | 315 | 480 | |
| 26 | UHPE$_{220}$ + CR$_9$ (25) | 250 | 600 | 0.65 | 350 | 470 | |
| 27 | UHPE$_{220}$ + CRH$_7$ (25) | 250 | 550 | 0.70 | 350 | 470 | |
| 28 | UHPE$_{220}$ + CRH$_{12}$ (25) | 250 | 650 | 0.65 | 350 | 470 | |

TABLE 1-continued

| Ex. No. | Compounding ratio of composition | Maximum speed (mm/min) | Impact strength (J/m) | Abrasion loss (%) | Tensile strength at break (kg/cm$^2$) | Elongation at break (%) | Note |
|---|---|---|---|---|---|---|---|
| 29 | UHPE$_{220}$ + SA (8) + CRH$_9$ (9) + LPE$_2$ (8) | 300 | 600 | 0.80 | 250 | 430 | |
| 30 | UHPE$_{220}$ alone | — | 500 | 0.50 | 390 | 440 | Compression sintering |
| 31 | UHPE$_{220}$ + LPE$_2$ (25) | 200 | 300 | 1.05 | 200 | 350 | U.S. Pat. No. 3,219,728 |
| 32 | UHPE$_{220}$ + LPE$_9$ (25) | 200 | 340 | 0.70 | 200 | 350 | |
| 33 | UHPE$_{220}$ + SA (2) + CRH$_9$ (2) + LPE$_9$ (2) | 30 | 520 | 0.52 | 380 | 440 | |
| 34 | UHPE$_{220}$ + SA (20) + CRH$_9$ (20) + LPE$_9$ (20) | 400 | 400 | 1.20 | 150 | 400 | |
| 35 | UHPE$_{220}$ + LA (25) | 250 | 300 | 1.00 | 200 | 350 | Bleeding was much |

What is claimed is:

1. A composition improved in extrudability comprising 100 parts by weight of an ultra-high molecular weight polyethylene having a viscometrically determined molecular weight of 1,000,000–6,000,000 and 10–50 parts by weight of at least one modifier selected from the group consisting of:
   (A) saturated aliphatic alcohols having 15–30 carbon atoms, and
   (B) petroleum hydrocarbon cyclopentadiene type resins having a molecular weight of 500–2,000 and a softening point of 70°–130° C.

2. A composition improved in extrudability comprising 100 parts by weight of an ultra-high molecular weight polyehylene and 10–50 parts by weight of a mixture consisting of (C) and at least one member selected from the group consisting of (A) and (B):
   (A) saturated aliphatic alcohols having 15–30 carbon atoms,
   (B) petroleum hydrocarbon cyclopentadiene type resins having a molecular weight of 500–2,000 and a softening point of 70°–130° C.,
   (C) low molecular weight polyethylene having a molecular weight of 1,000–20,000.

3. A composition according to claim 1 or 2, wherein said ultra-high molecular weight polyethylene has a molecular weight of 1,500,000–3,000,000.

4. A composition according to claim 1 or 2, wherein said saturated aliphatic alcohol has 16–20 carbon atoms.

5. A composition according to claim 4, wherein said saturated aliphatic alcohol is stearyl alcohol or coconut alcohol, said coconut alcohol being a mixture of alcohols having 16–18 carbon atoms.

6. A composition according to claim 1 or 2, wherein said petroleum hydrocarbon cyclopentadiene type resin is a hydrogenated resin.

7. A composition according to claim 6, wherein said hydrogenated resin has an average molecular weight of about 1,000 and a softening point of about 90° C.

8. A composition according to claim 2, wherein said low molecular weight polyethylene has a molecular weight of 5,000–20,000.

9. A composition according to claim 8, wherein the molecular weight of said low molecular weight polyethylene is 5,000–12,000.

10. A composition according to claim 1 or 2, wherein the total amount of modifiers is 15–35 parts by weight per 100 parts by weight of said ultra-high molecular weight polyethylene.

11. A composition according to claim 1 or 2, wherein said modifier is a mixture of two or more modifiers and the ratio, by weight, of the amount of the modifier used in the smallest amount to the amount of the modifier used in the largest amount is in the range of 1:1 to 1:10.

12. A composition according to claim 11, wherein said ratio, by weight, is in the range of 1:1 to 1:6.

13. A composition according to claim 2 which comprises 100 parts by weight of ultra-high molecular weight polyethylene, 5–15 parts by weight of component (A), 5–15 parts by weight of component (B) and 5–15 parts by weight of component (C), wherein the sum of components (A), (B) and (C) is 15–35 parts by weight.

14. A composition according to claim 13, wherein said ultra-high molecular weight polyethylene has a molecular weight of 1,500,000–3,000,000, said component (A) is stearyl alcohol, said component (B) is a hydrogenated petroleum hydrocarbon cyclopentadiene type resin having an average molecular weight of about 1,000 and a softening point of about 90° C. and said component (C) is a low molecular weight polyethylene having an average molecular weight of about 9,000.

15. In the extrusion molding of ultra-high molecular weight polyethylene having a viscometrically determined molecular weight of 1,000,000–6,000,000 wherein an extrusion aid is mixed with the polyethylene and the mixture is extruded, the improvement which comprises employing as the extrusion aid per 100 parts by weight of polyethylene at least 10–50 parts of at least one modifier selected from the
   (A) saturated aliphatic alcohols having 15–30 carbon atoms, and
   (B) petroleum hydrocarbon cyclopentadiene type resins having a molecular weight of 500–2,000 and a softening point of 70°–130° C.

* * * * *